United States Patent
Norman et al.

[11] Patent Number: 6,155,094
[45] Date of Patent: Dec. 5, 2000

[54] PRESSING TOOL FOR FORMING WINDING END TURNS IN A STATOR

[75] Inventors: Peter Michael Norman, Huntingdon, United Kingdom; Keith Alan Witwer, Bluffton, Ind.

[73] Assignees: Statomat Special Machines Ltd., Cambrideshire, United Kingdom; Franklin Electric Company, Inc., Bluffton, Ind.

[21] Appl. No.: 09/142,681

[22] PCT Filed: Mar. 10, 1997

[86] PCT No.: PCT/GB97/00623

§ 371 Date: Oct. 1, 1998

§ 102(e) Date: Oct. 1, 1998

[87] PCT Pub. No.: WO97/34358

PCT Pub. Date: Sep. 18, 1997

[30] Foreign Application Priority Data

Mar. 12, 1996 [GB] United Kingdom .................... 9605192

[51] Int. Cl.⁷ ..................................................... B21D 22/00
[52] U.S. Cl. ...................... 72/353.6; 72/353.4; 72/354.2; 72/393
[58] Field of Search .............................. 72/353.4, 353.6, 72/354.2, 393, 403

[56] References Cited

U.S. PATENT DOCUMENTS

| | | | |
|---|---|---|---|
| 284,440 | 9/1883 | Lamont | 72/353.4 X |
| 1,823,047 | 9/1931 | Hothersall | 72/393 |
| 2,227,524 | 1/1941 | Williams | 153/25 |
| 3,688,538 | 9/1972 | Hoyne | 72/94 |
| 3,841,133 | 10/1974 | Rice, Jr. et al. | 72/168 |
| 3,913,373 | 10/1975 | Kindig | 72/355 |
| 4,111,241 | 9/1978 | Crown | 140/92.7 |
| 4,798,072 | 1/1989 | Vanmeggelen et al. | 72/132 |
| 4,922,741 | 5/1990 | Bridges et al. | 72/306 |
| 5,235,738 | 8/1993 | Eminger | 29/596 |
| 5,269,165 | 12/1993 | Matsuoka | 72/138 |
| 5,491,886 | 2/1996 | Kieffer et al. | 29/736 |
| 5,697,245 | 12/1997 | Maeng | 72/353.4 |
| 5,704,244 | 1/1998 | Halasz et al. | 72/353.6 |

FOREIGN PATENT DOCUMENTS 0031739 7/1981 European Pat. Off. .
2330035 9/1975 Germany .

*Primary Examiner*—Joseph J. Hail, III
*Assistant Examiner*—William Hong
*Attorney, Agent, or Firm*—Wall Marjama & Bilinski

[57] ABSTRACT

A press tool for forming a compressible mass into an annulus of given inner and outer diameters and axial length, the tool having radially movable outer and inner tool parts adapted to expand and contract, respectively, to form the mass to the desired inner and outer diameters. An axially movable annular member includes a working face for forming the compressible mass to the desired axial length. Each of the tool parts include a first array of radially movable members, each formed with a head having a working face curved to the desired diameter and a second interposed array of radially movable members also having a head having a working face. A central portion of the working face is curved to the desired diameter and opposed sloping outer portions are shaped for sliding against rear-faces of the heads of respective adjacent members of the first array. The first and second arrays of movable members can be radially moved to compress the compressible mass into the desired diameter and so that during at least a part of the radial movement, the heads of the first and second arrays form continuous and substantially annular surfaces.

5 Claims, 4 Drawing Sheets

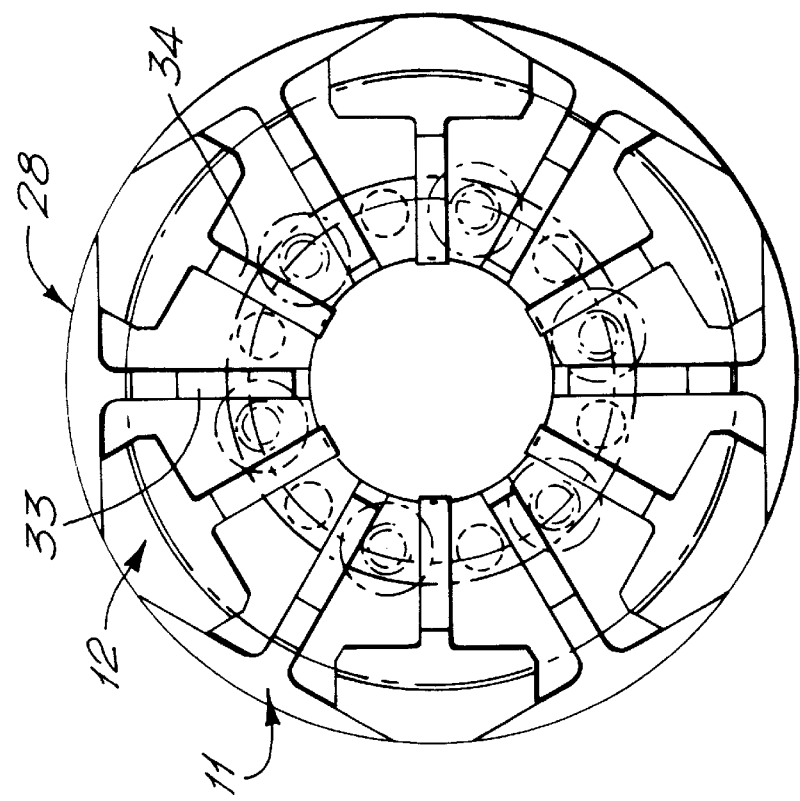
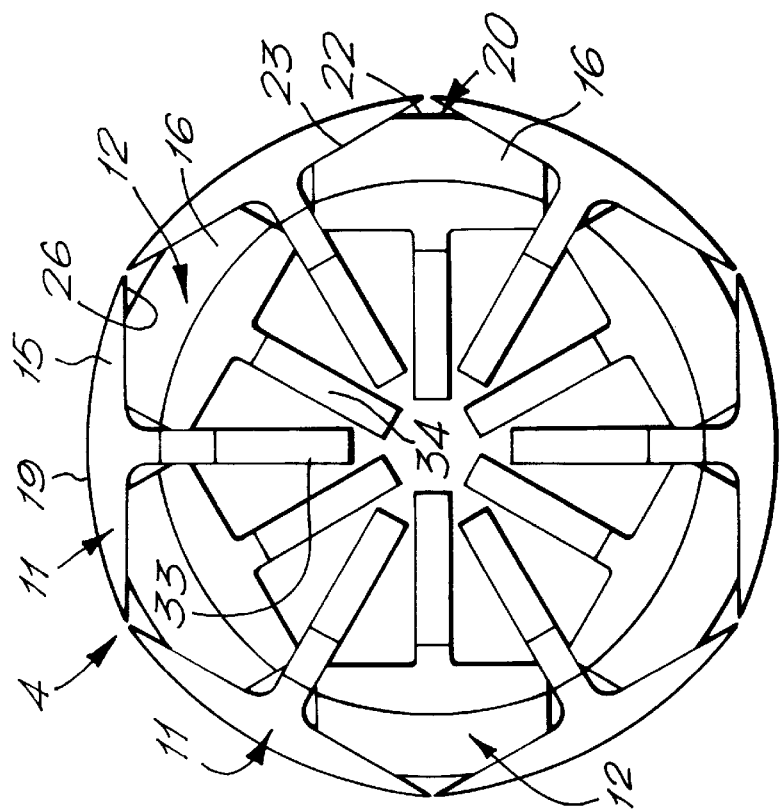

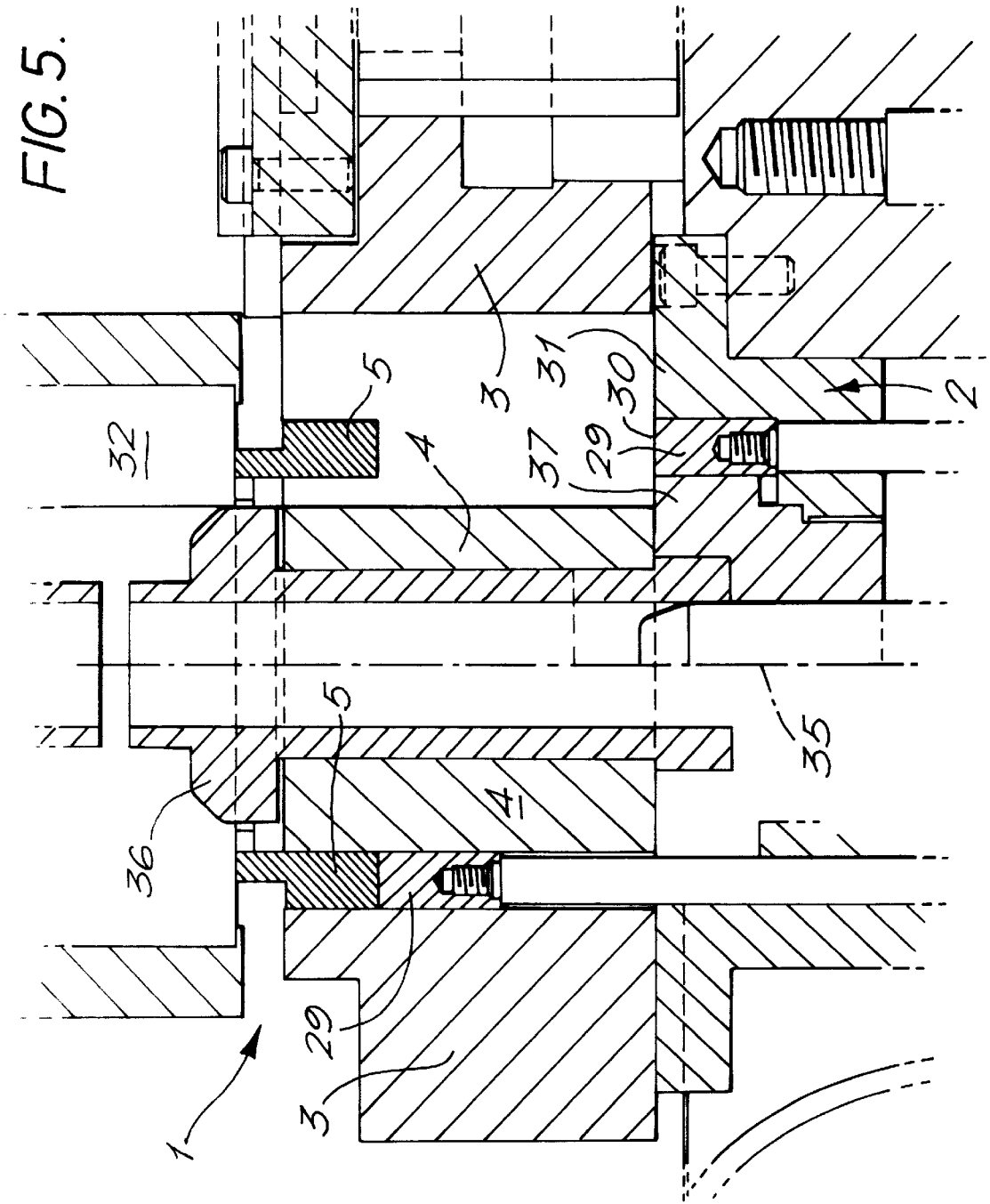

PRESSING TOOL FOR FORMING WINDING END TURNS IN A STATOR

FIELD OF THE INVENTION

The invention relates to press tools and more particularly, but not exclusively, to press tools for forming or shaping into an annular form of desired dimensions the end turns of wound wire coils of the stator of an electrical machine such as an electric motor.

BACKGROUND OF THE INVENTION

It is known to provide a forming press and tooling to form the end turns of the wound wire coils of a stator into an annulus of given external and internal diameters and axial length in a three stage process in which outer segments of the tooling contract to compress the end turns to define the outer diameter of the annulus, inner segments of the tooling expand to compress the end turns to define the inner diameter of the annulus and an annular end member is moved axially against the end turns to compress the end turns to define the axial length of the annulus.

A problem associated with the known tooling is that during the movement of the inner and outer segments and/or the end member, it is sometimes possible for the wire of the end turns to become trapped between the parts of the tooling so that the coils are damaged.

It is an object of the invention to provide tooling which will prevent or at least mitigate this problem.

SUMMARY OF THE INVENTION

According to the invention a press tool for forming a compressible mass into an annulus of given inner and outer diameters and axial length comprises radially movable inner and outer tool parts adapted to expand and contract respectively to form the mass to the desired inner and outer diameters, each of which tool parts comprises a first array of radially movable members, each of which members is formed with a head having a working face curved to the desired diameter, and each of which tool parts comprises a second array of radially movable members which are interposed between the respective members of the first array and which each have a head having a working face, a central portion of which working face is curved to the desired diameter and opposed sloping outer portions of which are shaped for sliding contact against rear faces of the heads of respective adjacent members of the said first array, whereby the first and second arrays of movable members can be moved radially to compress the compressible mass into the desired diameter and so that during at least a part of the radial movement, the heads of the first and second arrays form continuous substantially annular surfaces, and an axially movable annular member having a working face for forming the compressible mass to the desired axial length. Preferably the radially movable members and the annular member are mounted in a common body which may, for example, be plate-like or annular.

Preferably the axially movable annular end member is arranged in its axially retracted position to have its working face flush with a surrounding stationary body part substantially to eliminate gaps into which the compressible mass might become trapped.

The means for actuating the radially and axially movable parts of the press tool may be generally conventional, i.e. cam means, wedge means or the like and the actuating means may be under the control of one or more hydraulic rams, electrical actuators or the like.

From another aspect the invention is a forming press comprising tooling as described above.

Although the apparatus referred to in the description and claims is said to be for the purpose of forming a compressible mass into an annulus of given size, it will be appreciated that the apparatus may be used to form generally analogous shapes by suitably configuring the working faces of the movable members. Thus the faces of the members may be flat or comprise a series of flats, so that the movable members together form a compressible mass to a generally annular shape. References to the curved working faces of the movable members should be construed accordingly.

Among the advantages of the press tool shown in the following drawings are the following:

1. The press tool permits a reduction in the size of the forming cavity or cavities when open, due to the substantial elimination of wire traps. This enables the tool to operate with reduced working strokes, which reduces the cycle time to increase productivity. The reduced cavity size also permits the use of smaller tools. This, in turn, facilitates standardization of tooling;

BRIEF DESCRIPTION OF DRAWINGS

The invention is diagrammatically illustrated, by way of example, in the accompanying drawings in which:

FIG. 1 is an end view of an inner tool part of a press tool for forming a compressible mass, e.g. the end turns of the wound wire coils of a stator into an annulus, shown in a retracted position;

FIG. 2 is a view of the inner tool part of FIG. 1 shown in a radially expanded position;

FIG. 5 is a sectional side view of the press tool of FIGS. 1 to 4 and showing the inner and outer tool parts and a radially movable ring member for forming the annular compressible mass to a desired axial length, shown in both their retracted and advanced positions.

DETAILED DESCRIPTION OF THE INVENTION

Figure 3:
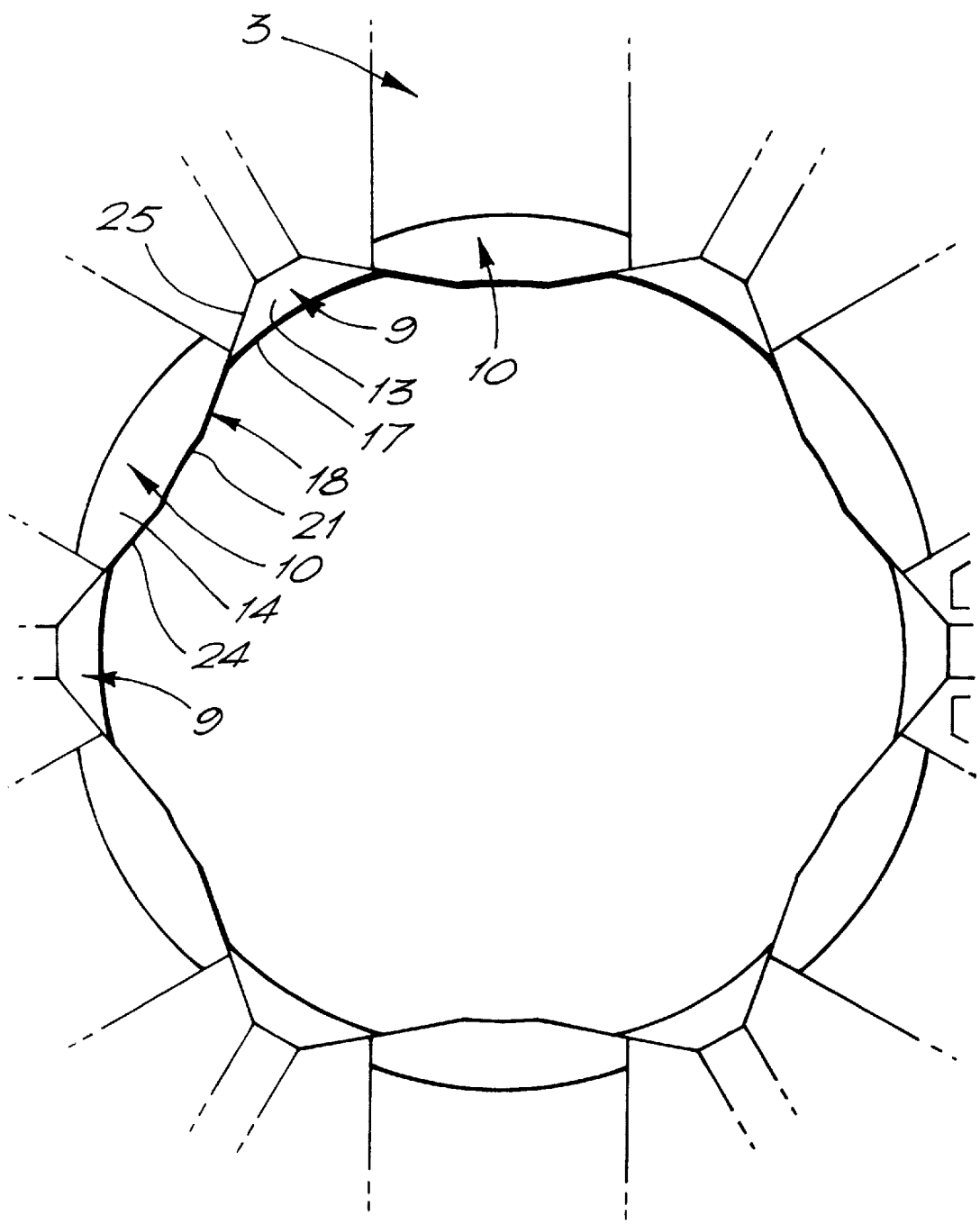
FIG. 3 is an end view of an outer tool part for a press tool for forming a compressible mass e.g. the end turns of the wound wire coils of a stator, shown in a retracted position.

In the drawings there is shown a press tool 1 for forming or shaping a compressible mass in the form of the end turns 5 of the wound wire coils in a stator 32 of an electrical machine. The press tool 1 comprises outer and inner tool parts 3 and 4 respectively for forming the required inner and outer diameters to the end turns 5 and an axially movable annular member 29 for forming the axial length of the end turns 5 in a three stage process, known per se. In the known process the outer and inner tool parts, which are usually segmental in shape, are moved sequentially against the end turns 5 to form them to the required inner and outer diameters after which the end member is moved against the end turns 5 while they are held compressed by the outer and inner tool parts to form the end turns to the required axial length.

Referring more particularly to FIGS. 1 and 2 of the drawings, the inner part 4 of the press tool consists of a first radial array of radially movable members 11 each of which has a head 15 having a convexly curved working face 19 and a rear face 26. Interposed between each member 11 is one of a second radial array of radially movable members 12 each of which has a head 16 having a working face 20, a central portion 22 of which is convexly curved and opposed sloping outer portions 23 of which slope away from the central portion 22. The arrangement is such that the sloping outer portions 23 of the heads 16 of the members 12 are in sliding contact with the rear faces 26 of the heads 15 of the members 11.

The members 11 are formed with inwardly extending radial stems 33 and the members 12 are formed with corresponding inwardly extending radial stems 34. The stems 33 and 34 are slidingly supported and guided in portions 36 and 37 of a body part 2 of the tool 1, see FIG. 5. The inner ends of the stems 34 are contacted by actuating means (not shown) but generally conventional per se e.g. cams, wedge devices or the like so that the members 11 and 12 are movable radially outwardly from the position shown in FIG. 1 of the drawings to the position shown in FIG. 2 of the drawings to bear against the end turns of the wire coil to form the end turns to the required inner diameter. In this condition the working surfaces together form a continuous annular surface 28.

In the known tooling the movement of the segmental parts of the tooling tends to trap individual wires of the coil between the segmental parts as they are advanced and retracted. In contrast the tooling shown in FIGS. 1 and 2 is arranged such that the inner and outer arrays of moving segmental tool parts 11, 12 are arranged not to form contracting gaps during their advance but instead form a continuous smooth surface as shown in FIG. 2. Any gaps between the parts which may be present when the tool is retracted into its open condition are arranged to expand and disappear during the tool advance. The members 11 and 12 are biased into the retracted position shown in FIG. 1 by resilient means e.g. springs or rubber rings, etc. in known manner.

Figure 4:
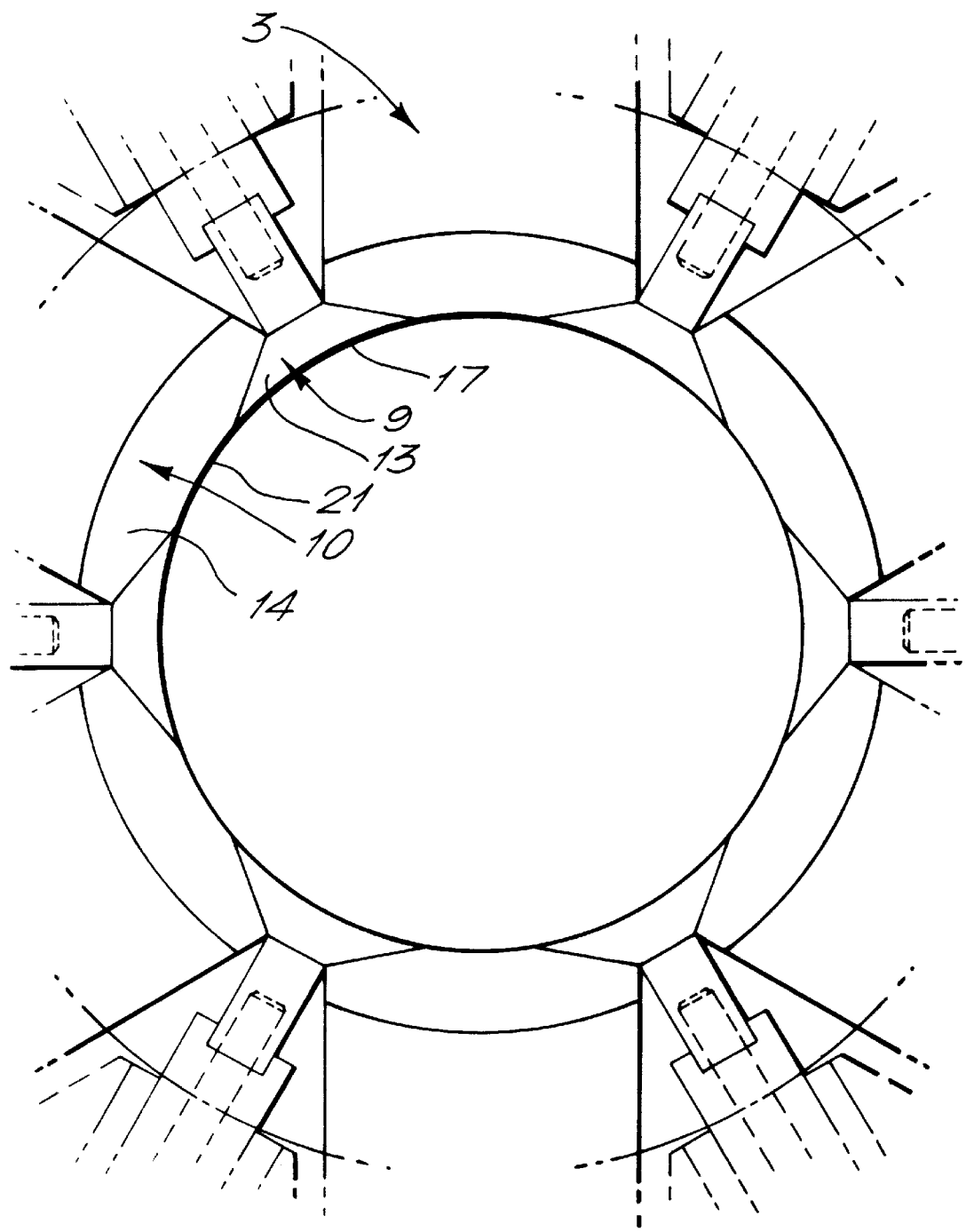
FIG. 4 is an end view of the tool part of FIG. 3 shown in a radially contracted position.

The outer tool part 3 shown in FIGS. 3 and 4 is generally similar to that described above with reference to the inner tool part 4 and comprises a first radial array of movable members 9 and a second radial array of movable members 10 disposed radially between the members 9, the members 9 and 10 being slidably mounted in the body 2 for radial movement. The members 9 have heads 13 formed with concavely curved working faces 17 and rear faces 25 and the members 10 of the second array have heads 14 having working faces 18, a central portion 21 of which is concavely curved and opposed outer portions 24 of which slope away from the central portion and are arranged for sliding contact with the rear faces 25 of the heads 13 whereby when the members 9 and 10 are contracted from the position shown in FIG. 3 to the position shown in FIG. 4 by generally conventional actuating means (not shown), the working faces of the heads 9 and 10 together form a substantially continuous annular face of the required diameter to compress the end turns of the stator to its required outer diameter. It will be noted that, unlike known forming tools, the parts 9 and 10 form a substantially continuous surface during the contraction from the retracted position shown in FIG. 3 to the advanced position shown in FIG. 4 to prevent trapping and damaging the coil during the forming process.

In FIG. 5 there is shown an axial section of the tooling of FIGS. 1 to 4 having a center line shown by chain dashed line 35. To the right of the center line the tool parts 3, 4 are shown in the retracted positions as indicated in FIGS. 1 and 3. In this position an axially movable annular member 29 slidably mounted in the tool body 2 is arranged to have its working face 30 flush with stationary inner and outer parts 31 and 37 of the body 2 so as to eliminate gaps between the tool parts to prevent the possibility of trapping any part of the coils to be formed.

The left hand portion of FIG. 5 shows the inner and outer tool parts advanced into contact with the end turns 5 to form the end turns to the required inner and outer diameters, and shows the axially movable annular member 29 advanced into its working position in which it slides between the outer and inner parts 3 and 4 and contacts the exposed axial end turns 5 of the coil to form the end turns into the required axial length.

Among the advantages of the press tool shown in the drawings are the following:

1. the press tool permits a reduction in the size of the forming cavity or cavities when open due to the substantial elimination of wire traps. This enables the tool to operate with reduced working strokes which reduces the cycle time of the tool to increase productivity. The reduced cavity size also permits the use of smaller tools. This in turn facilitates standardisation of tooling;
2. the press tool can be utilized to centralise relative to the stator core the coils to be formed prior to the forming step due to the lack of wire traps in the forming cavity. This eliminates the need for a separate centralizing device and again aids productivity, and
3. due to the absence of wire traps in the forming cavity, the degree of wire compression during forming can be increased to raise the conductive metal, e.g. copper, content of the end turns of the coils.

The invention thus provides tooling for forming compressible masses, e.g. the wound wire coils of stators to require sizes and which obviates or reduces problems associated with known tooling of this kind.

What is claimed is:

1. Apparatus for forming the end turns of a round wire coil of an electrical machine, said apparatus including a press tool for forming a compressible mass into an annulus of a given inner diameter, a given outer diameter and a given axial length, the press tool comprising:

a radially movable inner tool part which is expandable to form the compressible mass to the given inner diameter, said radially inner tool part comprising a first array of radially movable members and a second array of radially movable members which are interposed between respective radially movable members of the first array of the radially movable inner tool part, each radially movable member of the first array of the radially movable inner tool part comprising a head which has a working face curved to the given inner diameter, and each radially movable member of the second array of the radially movable inner tool part comprising a head which has a central portion and opposed sloping outer portions, the central portion being curved to the given inner diameter and each opposed sloping outer portion being shaped for sliding contact against a rear face of the head of an adjacent member of the first array of the radially movable inner tool part;

a radially movable outer tool part which is contractible to form the compressible mass to the given outer diameter, the radially movable outer tool part comprising a first array of radially movable members and a second array of radially movable members which are interposed between respective radially movable members of the first array of the radially movable outer tool part, each radially movable member of the first array of the radially movable outer tool part comprising a head which has a working face curved to the given outer diameter, and each radially movable member of the second array of the radially movable outer tool part comprising a head which has a central portion being curved to the given outer diameter and each opposed sloping outer portion being shaped for sliding contact against a rear face of the head of an adjacent member of the first array of the radially movable outer tool part; and an axially movable annular member having a working face for forming the compressible mass to the given axial length when advanced to its axially extended position;

whereby the radially movable inner and outer tool parts are respectively expandable and contractible to compress the compressible mass to the given inner and outer diameters respectively such that the heads of the radial movable members of the first and second arrays of the radially movable inner and outer tool parts from continuous substantially annular surfaces during at least a part of movement of the inner and outer tool parts;

the improvement comprising a body part for surrounding the axially movable annular member when in its axially retracted position with the working face of the axially movable annular member flush with the body part to substantially eliminate gaps into which the compressible mass might become trapped;

and wherein said axially movable member in its extended position is extended between said radially movable outer tool part and said radially movable inner tool part.

2. A forming press including a press tool for forming a compressible mass into an annulus of a given inner diameter, a given outer diameter and a given axial length, the press tool comprising:

a radially movable inner tool part which is expandable to form the compressible mass to the given inner diameter, said radially inner tool part comprising a first array of radially movable members and a second array of radially movable members which are interposed between respective radially movable members of the first array of the radially movable inner tool part, each radially movable member of the first array of the radially movable inner tool part comprising a head which has a working face curved to the given inner diameter, and each radially movable member of the second array of the radially movable inner tool part comprising a head which has a central portion and opposed sloping outer portions, the central portion being curved to the given inner diameter and each opposed sloping outer portion being shaped for sliding contact against a rear face of the head of an adjacent member of the first array of the radially movable inner tool part;

a radially movable outer tool part which is contractible to form the compressible mass to the given outer diameter, the radially movable outer tool part comprising a first array of radially movable members and a second array of radially movable members which are interposed between respective radially movable members of the first array of the radially movable outer tool part, each radially movable member of the first array of the radially movable outer tool part comprising a head which has a working face curved to the given outer diameter, and each radially movable member of the second array of the radially movable outer tool part comprising a head which has a central portion being curved to the given outer diameter and each opposed sloping outer portion being shaped for sliding contact against a rear face of the head of an adjacent member of the first array of the radially movable outer tool part; and an axially movable annular member having a working face for forming the compressible mass to the given axial length when advanced to its axially extended position;

whereby the radially movable inner and outer tool parts are respectively expandable and contractible to compress the compressible mass to the given inner and outer diameters respectively such that the heads of the radial movable members of the first and second arrays of the radially movable inner and outer tool parts from continuous substantially annular surfaces during at least a part of movement of the inner and outer tool parts;

the improvement comprising a body part for surrounding the axially movable annular member when in its axially retracted position with the working face of the axially movable annular member flush with the body part to substantially eliminate gaps into which the compressible mass might become trapped;

and wherein said axially movable member in its extended position is extended between said radially movable outer tool part and said radially movable inner tool part.

3. In a press tool for forming a compressible mass into an annulus of a given inner diameter, a given outer diameter, and a given axial length, said press tool comprising:

a radially movable inner tool part which is expandable to form the compressible mass to the given inner diameter, said radially inner tool part comprising a first array of radially movable members and a second array of radially movable members which are interposed between respective radially movable members of the first array of the radially movable inner tool part, each radially movable member of the first array of the radially movable inner tool part comprising a head which has a working face curved to the given inner diameter, and each radially movable member of the second array of the radially movable inner tool part comprising a head which has a central portion and opposed sloping outer portions, the central portion being curved to the given inner diameter and each opposed sloping outer portion being shaped for sliding contact against a rear face of the head of an adjacent member of the first array of the radially movable inner tool part;

a radially movable outer tool part which is contractible to form the compressible mass to the given outer diameter, the radially movable outer tool part comprising a first array of radially movable members and a second array of radially movable members which are interposed between respective radially movable members of the first array of the radially movable outer tool part, each radially movable member of the first array of the radially movable outer tool part comprising a head which has a working face curved to the given outer diameter, and each radially movable member of the second array of the radially movable outer tool part comprising a head which has a central portion being curved to the given outer diameter and each opposed sloping outer portion being shaped for sliding contact against a rear face of the head of an adjacent member of the first array of the radially movable outer tool part; and an axially movable annular member having a working face for forming the compressible mass to the given axial length when advanced to its axially extended position;

whereby the radially movable inner and outer tool parts are respectively expandable and contractible to compress the compressible mass to the given inner and outer diameters respectively such that the heads of the radial movable members of the first and second arrays of the radially movable inner and outer tool parts from continuous substantially annular surfaces during at least a part of movement of the inner and outer tool parts;

the improvement comprising a body part for surrounding the axially movable annular member when in its axially retracted position with the working face of the axially movable annular member flush with the body part to substantially eliminate gaps into which the compressible mass might become trapped;

and wherein said axially movable member in its extended position is extended between said radially movable outer tool part and said radially movable inner tool part.

4. A press tool according to claim 3, wherein the radially movable members and the annular member are mounted for movement in a common body.

5. A press tool according to claim 3, including means for actuating the radially and axially movable parts of the press tool.

\* \* \* \* \*

UNITED STATES PATENT AND TRADEMARK OFFICE
CERTIFICATE OF CORRECTION

PATENT NO. : 6,155,094
DATED : December 5, 2000
INVENTOR(S) : Norman et al.

It is certified that error appears in the above—identified patent and that said Letters Patent is hereby corrected as shown below:

Title page, item

[54] PRESS TOOLS

CLAIMS

Claim 3, Column 7, Line 10, after the word parts please delete "from" and replace in favor of the word --form--.

Signed and Sealed this

Eighth Day of May, 2001

*Attest:*

NICHOLAS P. GODICI

*Attesting Officer*     Acting Director of the United States Patent and Trademark Office